3,193,425
EDGE BONDING OF CONVEYOR BELTS
Dennis W. Holdsworth, Lincoln, Mass., assignor to American Biltrite Rubber Co., Inc., Chelsea, Mass., a corporation of Delaware
Filed Apr. 10, 1963, Ser. No. 272,119
8 Claims. (Cl. 156—137)

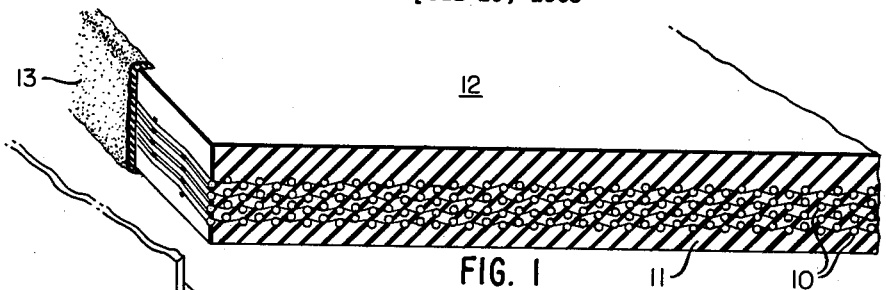
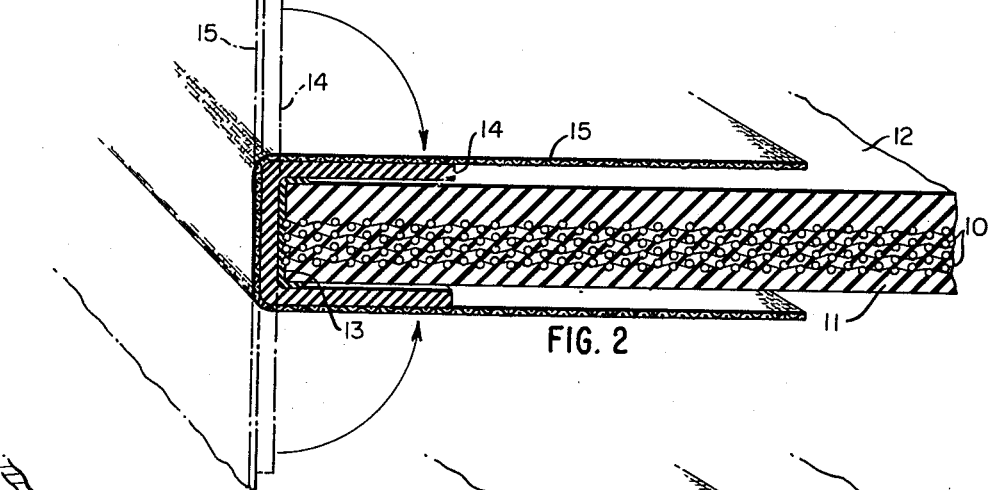
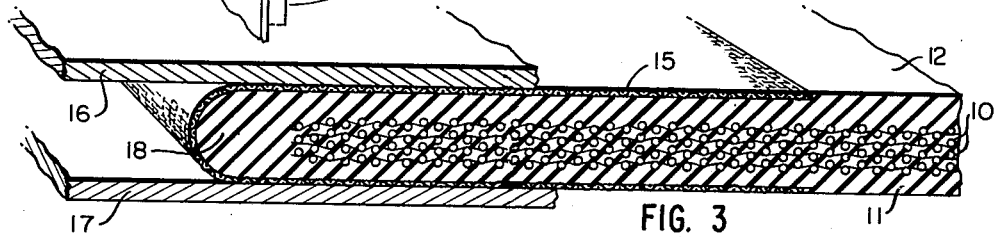
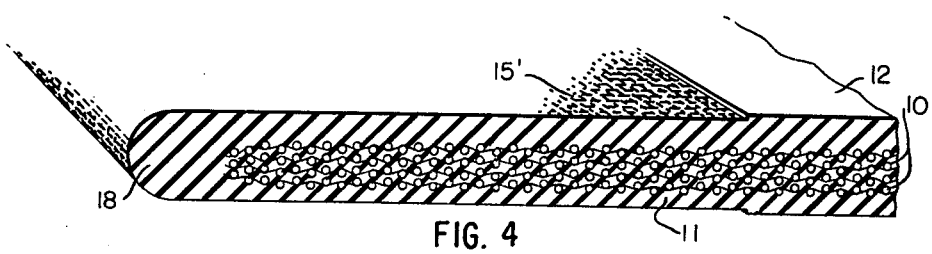

This invention comprises conveyor belting improved in respect to its edge formation and novel process of making the same.

Although the flat-load-carrying surface of a conveyor is subjected to severe wearing conditions it has been found that conveyor belts wear most rapidly at their edges. This is due to the fact that while the belts normally are guided to run in a straight path they frequently shift sufficiently to rub against the conveyor frame or housing. Contact of the moving belt edges with fixed portions of the conveyor structure produces rapid wear of the belt edges and reduces the useful life of the entire conveyor.

For this reason an attempt has been made to reinforce the edges of conveyor belts by adding plies of rubberized fabric within the body of the belt and extending these reinforcing plies about the edges. Attempts have also been made to thicken the edge portions of the belt by heating the belt and molding the edges thereof against rectangular metal side bars or edge rings. Belt edges so contoured tend to wear rapidly at the corners and another disadvantage is that in molding an overflow flash is often formed which must be trimmed off the finished belt. This flash may displace the carcass fabric from the center toward the edge of the belt and in some cases a portion of the carcass shifts into the overflow flash where it is trimmed off, very much to the detriment of the belt.

I have discovered that an improved edge structure for conveyor belts may be economically produced by applying a ribbon or strip of uncured elastomeric material to the edges of the belt and then molding and curing this additional material while confining it within a folded textile tape that imparts a rounded or semi-circular cross-section thereto.

The tape, which may be of thin tough material such as nylon, is folded or wrapped over the edges of the belt, extending inwardly beyond the elastomeric ribbon sufficiently to be temporarily attached to the body of the belting. After the molding and curing step in which the applied additional material of the elastomeric ribbon becomes an integral portion of the belt, the textile tape may be stripped from the cured belting in condition for reuse. The essential step of my novel process is the supplying of additional uncured elastomeric material in ribbon form to the edges of the belting while the material is molded into the desired rounded shape by the folded tape which acts as a sling or flexible mold for the confined material.

The term "elastomeric material" is used herein to mean an elastic rubber-like substance as natural rubber or synthetic rubber or resin.

These and other features of the invention will be best understood and appreciated from the following description of a preferred manner of carrying out the process as shown in the accompanying drawings, in which:

FIGS. 1–4 are views partly in perspective and partly in cross section showing the product in successive stages of treatment.

The belting as shown in FIG. 1 comprises four intermediate plies 10 of rubberized fabric, a bottom ply 11 of rubber or other elastomeric material and a thicker top ply 12 of the same material. The number of intermediate plies may be varied in accordance with the intended duty of the belting. The process may be applied with good advantage to conveyor belting having two intermediate plies.

As originally produced the edges of the belting may be somewhat irregular in contour and accordingly it is usually desirable preliminarily to trim the belting in accordance with the required finished width thereof. The belting shown in FIG. 1 is represented as having been edge trimmed and in this step the textile strands of the intermediate plies 10 are exposed in superposed relation. The body of the belting at this stage may be either vulcanized or uncured.

The next step of the process consists in applying a band of cement 13 to the trimmed edge surface of the belting and this step is suggested in FIG. 1.

Having thus prepared the belting additional unvulcanized rubber or uncured resin as the case may be is supplied to the trimmed edge in the form of a thick ribbon 14. This material comes to the belting adhesively attached to a thin tough tape 15 of textile fabric such as nylon which is considerably wider than the ribbon 14.

As suggested in FIG. 2 the ribbon-carrying tape is first presented in right angular position thus bringing the ribbon against the trimmed and coated edge of the belting. The tape is then folded inwardly so that the rubber ribbon 14 is folded and caused to embrace the edge portion of the belting. The tape 15 extends inwardly beyond the ribbon 14 and lies in direct contact with the upper and lower surfaces of the belting.

Having applied the ribbon as thus explained the assembled parts are now subjected to molding and curing pressure between heated platens 16 and 17 as shown in FIG. 3. In this operation the tape 15 becomes temporarily bonded to the belting, the impression 15' of the tape being shown in the top ply 12 of the belting in FIG. 4. During the molding and curing step the tape 15 acts as a sling or a flexible U-shaped mold for the material 14, which has been supplied in ribbon form and now takes the round edge configuration 18 shown in FIG. 3. In this step the belting is reduced and compacted and this reduction may be approximately 14%–18% of its original uncured thickness.

At the conclusion of this step the tape 15 may be stripped from the body of the belting in condition for re-use leaving the belting with a smooth rounded edge portion 18 of solid rubber or cured resin permanently united to and forming an integral part of the belting. It will be apparent that the uncured elastomeric material supplied in the form of the ribbon 14 has been converted and transformed into the cured integral edge portion 18 of the belting.

Having thus disclosed my invention what I claim as new and desire to secure by Letters Patent is:

1. The process of producing round-edge belting having elastomeric covering material, which comprises the following steps, viz.,
    (1) leading to an edge of the belting a fabric backing tape carrying a ribbon of uncured elastomeric material adhesively attached thereto,
    (2) folding the ribbon with its backing tape about the edge of the belting,
    (3) securing the backing tape directly to the flat faces of the belting while the elastomeric ribbon is confined within the backing tape,
    (4) heating and molding the elastomeric material of the belting and the ribbon while confined by the backing tape, and
    (5) stripping the used tape from the belting, leaving the molded elastomeric ribbon as a rounded integral edge portion of the belting.

2. The process defined in claim 1, further characterized by carrying out the listed steps simultaneously upon opposite edges of a flat belt.

3. The process defined in claim 1, further characterized in that in the heating and molding step the belting is reduced substantially as compared to its original uncured thickness.

4. The process of making round-edge belting, comprising the steps of trimming the edges of unvulcanized belting containing plies of rubberized fabric, thereby exposing said fabric, applying to the trimmed edges of the belting additional unvulcanized rubber in the form of a continuous ribbon carried by a wider nylon tape, attaching the edges of the tape to the opposite surfaces of the belting, thereby folding the rubber ribbon about the edges of the belting, and subjecting the folded ribbon to vulcanizing heat and pressure.

5. The process of producing round-edge belting comprising the steps of applying cement to the opposite edges of belting containing a ply of rubberized fabric, leading to the cemented edges of the belting a continuous ribbon of unvulcanized rubber which is temporarily attached to a wider nylon tape, folding the tape about the belting thus holding the rubber ribbon against the edges of the rubberized ply, and subjecting the rubber ribbon to heat and molding pressure while confined in rounded contour by the nylon tape.

6. The process of producing round edge conveyor belting, comprising the following steps, viz., (1) leading to the edges of a preformed elastomeric belting a ribbon of rubber carried by a wider textile backing tape, (2) pressing the tape in right-angular relation against the edge of the belting, and folding it thereon, (3) attaching the edges of the backing tape to the flat surfaces of the belting beyond the margins of the ribbon, and (4) curing the folded ribbon in situ upon the belting.

7. The process of making elastomeric multi-ply belting, characterized by the following steps:

(1) trimming the marginal edges of laminated plies of unvulcanized rubberized fabric which have been incorporated in the belting and thereby exposing the fabric of the plies, (2) applying ribbons of unvulcanized rubber to the exposed trimmed edges of the plies, and (3) then simultaneously molding and vulcanizing the rubber of said ribbons together with the laminated rubberized plies.

8. The process defined in claim 7, further characterized in that the ribbons of unvulcanized rubber are applied to the marginal edges of the laminated plies while contained in a continuous sling of adherent fabric which is removed from the laminated plies after the vulcanizing step.

References Cited by the Examiner

UNITED STATES PATENTS

| 61,173 | 1/67 | Dodge | 156—202 |
| 1,590,371 | 6/26 | Haren | 156—202 |
| 2,342,261 | 2/44 | Foerch et al. | 156—202 |
| 2,696,865 | 12/54 | Seiler | 156—202 |
| 2,748,044 | 5/56 | Seiler | 74—232 |
| 3,000,771 | 9/61 | Runton | 74—232 |
| 3,123,508 | 3/64 | Waugh | 156—246 |

EARL M. BERGERT, *Primary Examiner.*